(12) United States Patent
Xiao et al.

(10) Patent No.: US 11,310,445 B2
(45) Date of Patent: Apr. 19, 2022

(54) DYNAMIC VISION SENSOR

(71) Applicant: Huawei Technologies Co., Ltd., Shenzhen (CN)

(72) Inventors: Zhaolei Xiao, Shenzhen (CN); Jiantong Zhou, Shenzhen (CN); Yuntan Fang, Beijing (CN); Shan Gao, Dongguan (CN); Zhenhua Wu, Shenzhen (CN); Jing Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/215,729

(22) Filed: Mar. 29, 2021

(65) Prior Publication Data

US 2021/0218913 A1   Jul. 15, 2021

Related U.S. Application Data

(63) Continuation of application No. PCT/CN2019/105187, filed on Sep. 10, 2019.

(30) Foreign Application Priority Data

Sep. 29, 2018 (CN) .......................... 201811151126.3

(51) Int. Cl.
*H04N 5/351* (2011.01)
*H04N 5/378* (2011.01)

(52) U.S. Cl.
CPC ............. *H04N 5/351* (2013.01); *H04N 5/378* (2013.01)

(58) Field of Classification Search
CPC ............................... H04N 5/351; H04N 5/378
See application file for complete search history.

(56) References Cited

U.S. PATENT DOCUMENTS

| | | | |
|---|---|---|---|
| 2018/0191972 A1* | 7/2018 | Berner | ................ H01L 27/1461 |
| 2021/0092259 A1* | 3/2021 | Zeng | ..................... H04N 5/144 |

FOREIGN PATENT DOCUMENTS

| | | |
|---|---|---|
| CN | 101800837 A | 8/2010 |
| CN | 103458279 A | 12/2013 |
| CN | 104821060 A | 8/2015 |
| CN | 105163048 A | 12/2015 |
| CN | 107071314 A | 8/2017 |
| CN | 107147856 A | 9/2017 |

(Continued)

OTHER PUBLICATIONS

Lichtsteiner, P. et al., "A 128×128 120 dB 15μs Latency Asynchronous Temporal Contrast Vision Sensor", IEEE Journal of Solid-State Circuits, vol. 43, No. 2, Feb. 2008, 24 pages.

(Continued)

*Primary Examiner* — Nicholas G Giles
(74) *Attorney, Agent, or Firm* — Slater Matsil, LLP

(57) ABSTRACT

This application provides a dynamic vision sensor. The sensor converts an optical signal into an electrical signal by using a photoelectric conversion unit, to generate a photovoltage; performs second-order difference on the photovoltage by using a second-order differential circuit; and generates a second-order event signal based on a result of second-order difference. A camera including the sensor can generate an image based on the second-order event signal, where the image represents a change of a light change speed.

18 Claims, 13 Drawing Sheets

(56) References Cited

FOREIGN PATENT DOCUMENTS

| CN | 108200362 A | 6/2018 |
|---|---|---|
| WO | 2018039638 A1 | 3/2018 |

OTHER PUBLICATIONS

Guerrero, F.N. et al., "Analysis and Simple Circuit Design of Double Differential EMG Active Electrode", IEEE Transactions on Biomedical Circuits and Systems, vol. 10, No. 3, Jun. 2016, pp. 787-795.

Naganuma, H. et al., "A 37 ×37 Pixels Artificial Retina Chip with Edge Enhancement Function for 3-D Stacked Fully Implantable Retinal Prosthesis", 2012 IEEE Biomedical Circuits and Systems Conference (BioCAS), Nov. 28-30, 2012, pp. 212-215.

\* cited by examiner

Second-order differential circuit 122

DYNAMIC VISION SENSOR

CROSS-REFERENCE TO RELATED APPLICATIONS

This application is a continuation of International Application No. PCT/CN2019/105187, filed on Sep. 10, 2019, which claims priority to Chinese Patent Application No. 201811151126.3, filed on Sep. 29, 2018. The disclosures of the aforementioned applications are hereby incorporated by reference in their entireties.

TECHNICAL FIELD

This application relates to the field of image capture technologies, and in particular, to a dynamic vision image capture apparatus and method.

BACKGROUND

With the development of the society, a requirement on quality of a captured image is increasingly high in the field of image capture. Generally, a camera can capture 25 to 30 frames per second. A frame rate of the camera is not high enough to capture images of high-speed moving objects. Currently, there are two main camera technologies in the field of motion image capture: a high-speed camera for capturing data based on a "frame" and a dynamic vision sensor (dynamic vision sensor, DVS) for capturing data based on an "event signal". The high-speed camera can capture about 1000 frames per second. Although the high-speed camera can capture high-speed moving objects, an amount of data captured by the high-speed camera is huge due to a large quantity of captured frames. This results in high energy consumption and low efficiency. In contrast, a DVS imaging device has been widely used in the field of motion image capture due to fast data capture, a low capture amount, and low power consumption.

A pixel capture circuit structure in the DVS simulates an imaging principle of a retina. A photodiode in the DVS converts a sensed optical signal into an electrical signal, and amplifies and outputs, by using a first-order differential circuit, an electrical signal change caused by an intensity change. When the electrical signal change is greater than a threshold, the change is defined as an "event signal". Only when the event signal occurs, that is, a pixel senses the intensity change, the sensor generates a pulse and performs data communication, to generate an image. For a difference between an imaging effect of the DVS and an imaging effect of a common camera, refer to FIG. 1. As shown in FIG. 2, an existing DVS structure usually includes an image receiver, a differential circuit, and a comparison apparatus. The image receiver, the differential circuit, and the comparison apparatus respectively correspond to a photoreceptor, a bipolar cell, and a ganglion cell in a biological visual system in terms of functions. In the image receiver, a photodiode converts a sensed optical signal into an electrical signal, to generate a logarithmic voltage, where a logarithmic representation method facilitates measurement of light intensity in a large scope. The differential circuit uses the logarithmic voltage as an input, and outputs a voltage difference $V_{diff}$ after a differential amplifier amplifies the logarithmic voltage. The differential circuit has a feature of "suppressing a common-mode signal and amplifying a differential-mode signal", and can amplify and output an electrical signal change caused by an intensity change. Finally, the comparison apparatus compares the input $V_{diff}$ with a specified threshold voltage, and outputs a pulse signal. For example, when $V_{diff}$ is greater than a positive threshold, a positive pulse is output; or when $V_{diff}$ is less than a negative threshold, a negative pulse is output. The pulse signal is transmitted to an external circuit according to a handshake protocol, to perform data communication. In addition, the pulse signal is also fed back to a reset switch in the differential circuit to reset the voltage, to perform data communication when a next "event" arrives. Based on the three phases, the sensor generates a pulse and performs data communication only when an event occurs, that is, intensity changes. The sensor is very sensitive to a temporal contrast (TCON, Temporal Contrast). The TCON measures a change amount of a current logarithmic value within a specific period of time, and is defined as:

$$TCON = \frac{d(\ln(I(t)))}{dt}$$

A relationship between the output voltage $V_{diff}$ of the differential circuit and the TCON may be expressed as follows:

$$V_{diff} \propto \int_{t}^{t+\Delta t} TCON(t')dt'$$

The comparison apparatus compares $V_{diff}$ with the threshold voltage, and outputs a positive pulse or a negative pulse. It can be learned that what the DVS imaging device records is not an actual scene image, but an intensity change in a scene. In addition, in an asynchronous output mode, a pixel change can be quickly output, thereby avoiding bus congestion. Therefore, the DVS imaging device greatly reduces a data capture amount, optimizes utilization of a bus, and reduces energy consumption.

However, the existing DVS uses the first-order differential circuit to capture a motion image, and is very sensitive to an intensity change. When the imaging device is also moving, it is equivalent to that each pixel in an entire image senses an intensity change, a captured image is very noisy, and it is difficult to filter out background interference. This affects recognition of key information in a scene. In addition, the advantage of the asynchronous output cannot be reflected. This may cause bus congestion. For example, when the existing DVS imaging device is used to detect a road condition of an autonomous driving system and continuously record the road condition and surrounding sceneries during the driving, if an obstacle suddenly appears in front of the vehicle, an image captured by the camera is a panoramic image of the obstacle mixed in the surrounding scene, and it is difficult for a machine to distinguish and recognize the obstacle. Consequently, security risks may exist. In addition, when the imaging device is moving, because intensity of each pixel changes, all pixels continuously capture information. Consequently, not only the advantage of reducing a data capture amount is difficult to reflect, but also a channel may be congested. As a result, communication is not smooth, and driving safety is affected. Therefore, how to filter out background interference and effectively recognize key information in a scene when the DVS imaging device is moving becomes an important topic that needs to be urgently dealt with by a person skilled in the art.

SUMMARY

This application provides a dynamic vision sensor and a sensing apparatus, and an imaging method applied to the sensor and the sensing apparatus. Second-order difference is performed on a photovoltage, and a second-order event signal is generated based on a second-order differential voltage, so that background information in imaging is effectively reduced when a camera that uses the sensor or the sensing apparatus is moving, and an unexpected event that causes a change of a light change speed is effectively captured.

According to a first aspect, this application provides a dynamic vision sensor. The sensor may include a photoelectric conversion unit, a second-order differential unit, and a comparison unit. The photoelectric conversion unit may be configured to convert a received optical signal into an electrical signal, to generate a photovoltage. The second-order differential unit may be configured to perform second-order difference on the photovoltage, to generate a second-order differential voltage. The comparison unit may be configured to compare the second-order differential voltage with a second-order comparison threshold, and generate a second-order event signal based on a comparison result. The sensor responds to a second-order differential result of the photovoltage, so that the output second-order event signal represents a change of a light change speed. In other words, the sensor responds to an acceleration of a light change. This reduces continuous and meaningless response outputs of the sensor caused by motion of the sensor, improves imaging quality, and reduces bus congestion.

Optionally, the second-order differential voltage may include a non-zero second-order differential voltage and a zero second-order differential voltage; and that the second-order differential unit is configured to perform second-order difference on the photovoltage, to generate a second-order differential voltage may include: When a change speed of a photovoltage at a current moment is different from a change speed of a photovoltage at a previous moment, the second-order differential unit is configured to generate the non-zero second-order differential voltage; or when the change speed of the photovoltage at the current moment is the same as the change speed of the photovoltage at the previous moment, the second-order differential unit is configured to generate the zero second-order differential voltage. That the change speeds are the same herein may mean that the voltage at the current moment and the voltage at the previous moment change at a same speed, or may mean that both the voltage at the current moment and the voltage at the previous moment remain unchanged, that is, the change speed is 0. The second-order differential circuit makes different responses to relationships between the change speed of the photovoltage at the current moment and the change speed of the photovoltage at the previous moment, to output an effect of reflecting the change of the light change speed.

Optionally, the second-order comparison threshold may include a positive second-order comparison threshold and a negative second-order comparison threshold. The positive second-order comparison threshold and the negative second-order comparison threshold may be symmetrically set, or may be asymmetrically set. This is not limited herein. The comparison unit may generate a positive pulse signal when the second-order differential voltage is not less than the positive second-order comparison threshold, may generate a negative pulse signal when the second-order differential voltage is not greater than the negative second-order comparison threshold, or may generate a zero pulse signal when the second-order differential voltage is less than the positive second-order comparison threshold and greater than the negative second-order comparison threshold. The positive and negative thresholds are set, and different signals are output based on different relationships between the second-order differential voltage and the positive and negative thresholds. This can more accurately reflect a change of a photovoltage change speed, and improve output precision of the sensor.

Optionally, the second-order differential unit may include a sample-and-hold circuit and a second-order differential circuit. The sample-and-hold circuit may be configured to convert the photovoltage into a differential input voltage; and the second-order differential circuit may be configured to perform second-order difference on the photovoltage based on the differential input voltage, to generate the second-order differential voltage. When multi-order difference is performed on the photovoltage, the differential input voltage generally needs to include a plurality of voltages, and these voltages one-to-one correspond to photovoltages at a plurality of different moments. When second-order difference is performed, the photovoltage generally includes three voltages. The three voltages correspond to photovoltages at three different moments. The second-order differential unit includes the sample-and-hold circuit, so that an additional apparatus does not need to be added to the sensor to obtain the photovoltages at the three different moments, to input all the photovoltages at the three different moments to the second-order differential circuit, thereby simplifying a structure of the sensor.

Optionally, the second-order differential circuit may include a first first-order differential circuit and a second first-order differential circuit, and the two differential circuits are connected in series. The first first-order differential circuit may be configured to generate a first first-order differential voltage and a second first-order differential voltage based on the differential input voltage, and the second first-order differential circuit may be configured to generate the second-order differential voltage based on the two first-order differential voltages. The first-order differential circuits are connected in series, so that flexibility of a sensor function is increased. An output of the first first-order differential circuit may be used as a part of a final output result, to obtain first-order differential data of the photovoltage, so that the sensor has both a function of obtaining a first-order event signal and a function of obtaining a second-order event signal.

Optionally, the second-order differential circuit may not use a form in which the first-order differential circuits are connected in series, but use a second-order differential circuit that is designed as a whole. Using of the second-order differential circuit that is designed as a whole reduces complexity of the circuit and increases reliability of a device.

Optionally, either the first first-order differential voltage or the second first-order differential voltage may be sent to the comparison unit. The comparison unit may be further configured to compare the received first-order differential voltage with a first-order comparison threshold, and generate a first-order event signal based on a comparison result. Optionally, both the first first-order differential voltage and the second first-order differential voltage may alternatively be sent to the comparison unit. The comparison unit separately compares the two first-order differential voltages with the first-order comparison threshold, generates a first first-order event signal based on a comparison result of the first first-order differential voltage, and generates a second first-order event signal based on a comparison result of the second first-order differential voltage. For details of the first-order comparison threshold, refer to the foregoing related description of the second-order comparison threshold. Details are not described herein again. The output of the first first-order differential circuit is used as a part of the output result, to obtain the first-order differential data of the photovoltage, so that the sensor has both the function of obtaining a first-order event signal and the function of obtaining a second-order event signal, thereby increasing flexibility of the sensor function.

Optionally, the sensor may further include a gating unit, configured to: when a preset condition is satisfied, control the second first-order differential circuit to generate the second-order differential voltage based on the first first-order differential voltage and the second first-order differential voltage. The preset condition may be determining whether the sensor is moving. When it is determined that the sensor is moving, the first first-order differential voltage and the second first-order differential voltage are input to the second first-order differential circuit, to generate the second-order differential voltage. When it is determined that the sensor is stationary, neither the first first-order differential voltage nor the second first-order differential voltage is input to the second first-order differential circuit. Whether to perform second-order difference on light is determined based on different situations, so that an output of the sensor better satisfies a scene requirement. When the sensor is stationary, the first-order event signal is output to ensure accuracy of output content. When the sensor is moving, the second-order event signal is output to reduce image noise caused by motion of the sensor.

Optionally, the sensor may further include a readout circuit; and the photoelectric conversion unit is further configured to send the photovoltage to the readout circuit, and the readout circuit is configured to perform integration on the photovoltage, to generate an integral voltage signal. The integral voltage signal is used to generate a frame-based image, to be specific, an image generated by a conventional camera. In addition to the second-order event signal or the first-order event signal, the sensor also outputs the integral voltage signal, so that the output of the sensor can be used to generate both a dynamic vision image and a conventional image. This makes it possible to fuse the two images to improve image quality.

According to a second aspect, this application provides a dynamic vision sensing apparatus, including a dynamic vision sensor array and a peripheral circuit. The dynamic vision sensor array includes a plurality of sensors, and these sensors are the dynamic vision sensor described in any possible implementation of the first aspect. These dynamic vision sensors each are configured to: generate a second-order event signal based on a received optical signal, and send the second-order event signal to the peripheral circuit. The peripheral circuit is configured to generate an address event representation based on the second-order event signal. The address event representation includes the second-order event signal and position information of the dynamic vision sensor that generates the second-order event signal. The position information may be coordinate information of the sensor, or may be any other information that can indicate a position of the sensor. This is not limited herein. The sensing apparatus responds to a second-order differential result of a photovoltage, so that the output address event representation represents a change of a light change speed. In other words, the sensing apparatus responds to an acceleration of a light change. This reduces continuous and meaningless response outputs of the sending apparatus caused by motion of the sending apparatus, improves imaging quality, and avoids bus congestion.

Optionally, when the sensor in the dynamic vision sensor array uses a construction form in which first-order differential circuits are connected in series to obtain a second-order differential circuit, the sensor may further output a first-order event signal to the peripheral circuit, and the peripheral circuit generates an address event representation based on the first-order event signal. In this way, the sensing apparatus can obtain not only the address event representation based on the first-order event signal, but also the address event representation based on the second-order event signal, thereby increasing flexibility of a function of the sensing apparatus. In addition, whether to output the address event representation based on the first-order event signal or the address event representation based on the second-order event signal is determined based on different situations, so that an output of the sensing apparatus better satisfies a scene requirement. When the sensing apparatus is stationary, the address event representation based on the first-order event signal is output to ensure accuracy of output content. When the sensing apparatus is moving, the address event representation based on the second-order event signal is output to reduce image noise caused by motion of the sensing apparatus.

Optionally, when the sensor in the dynamic vision sensor array includes a readout circuit, the sensor may further output an integral voltage signal to the peripheral circuit. In addition to the address event representation, the sensing apparatus may also output the integral voltage signal that is used to generate a frame-based image, so that the output of the sensing apparatus can be used to generate both a dynamic vision image and a conventional image. This makes it possible to fuse the two images to improve image quality.

According to a third aspect, this application provides a dynamic vision camera, including the dynamic vision sensing apparatus described in any implementation of the second aspect, and further including an operating circuit. The operating circuit may be configured to generate an image based on the address event representation that is output by the dynamic vision sensing apparatus and that is based on the second-order event signal. In this way, the generated image records information about a pixel whose light change speed changes, that is, records only a key event that causes the light change speed to change, thereby reducing background noise caused by motion of the camera, and improving imaging quality.

According to a fourth aspect, this application provides a mobile terminal device, including the dynamic vision camera described in the third aspect, and further including a communications unit. The communications unit may be configured to send the generated image to another device. The image generated by the terminal device records information about a pixel whose light change speed changes, that is, records only a key event that causes the light change speed to change, thereby reducing background noise caused by motion of the terminal device, and improving imaging quality. In addition, the image may be further sent to another device, to share the image among a plurality of devices.

According to a fifth aspect, this application provides a simultaneous localization and mapping system, including the dynamic vision sensing apparatus described in any implementation of the second aspect, and further including an operating circuit. The operating circuit is configured to perform scene recognition based on the address event representation that is output by the dynamic vision sensing apparatus and that is based on the second-order event signal. The sensing apparatus responds to a second-order differential result of a photovoltage, so that the output address event representation represents a change of a light change speed. In other words, the sensing apparatus responds to an acceleration of a light change. This reduces background noise interference caused by motion of the system, and improves accuracy of object recognition. Optionally, the simultaneous localization and mapping system may be implemented in a form of a head-mounted display device, an unmanned aerial vehicle, an intelligent road condition recognition system, or the like.

According to a sixth aspect, this application provides a dynamic vision sensing method, including: converting an optical signal into an electrical signal, to generate a photovoltage; performing second-order difference on the photovoltage, to generate a second-order differential voltage; and comparing the second-order differential voltage with a second-order comparison threshold, and generating a second-order event signal based on a comparison result. A second-order differential result of the photovoltage is responded to, so that the output second-order event signal represents a change of a light change speed. In other words, the output second-order event signal responds to an acceleration of a light change. This reduces continuous and meaningless response outputs caused by motion of a device that obtains the optical signal, improves imaging quality, and reduces bus congestion.

Optionally, the second-order comparison threshold may include a positive second-order comparison threshold and a negative second-order comparison threshold. The positive second-order comparison threshold and the negative second-order comparison threshold may be symmetrically set, or may be asymmetrically set. This is not limited herein. A positive pulse signal may be generated when the second-order differential voltage is not less than the positive second-order comparison threshold, a negative pulse signal may be generated when the second-order differential voltage is not greater than the negative second-order comparison threshold, or a zero pulse signal may be generated when the second-order differential voltage is less than the positive second-order comparison threshold and greater than the negative second-order comparison threshold. The positive and negative thresholds are set, and different signals are output based on different relationships between the second-order differential voltage and the positive and negative thresholds. This can more accurately reflect a change of a photovoltage change speed, and improve output precision.

Optionally, the second-order differential voltage may include a non-zero second-order differential voltage and a zero second-order differential voltage; and the performing second-order difference on the photovoltage, to generate a second-order differential voltage may include: when a change speed of a photovoltage at a current moment is different from a change speed of a photovoltage at a previous moment, generating the non-zero second-order differential voltage; or when the change speed of the photovoltage at the current moment is the same as the change speed of the photovoltage at the previous moment, generating the zero second-order differential voltage. That the change speeds are the same herein may mean that the voltage at the current moment and the voltage at the previous moment change at a same speed, or may mean that both the voltage at the current moment and the voltage at the previous moment remain unchanged, that is, the change speed is 0. The second-order differential circuit makes different responses to relationships between the change speed of the photovoltage at the current moment and the change speed of the photovoltage at the previous moment, to output an effect of reflecting the change of the light change speed.

Optionally, the performing second-order difference on the photovoltage may include: first performing first-order difference on the photovoltage, to generate a first-order differential voltage, and then performing first-order difference on the first-order differential voltage, to generate the second-order differential voltage. First-order difference is performed twice, so that flexibility of an output function is increased. The first-order differential voltage may be used as a part of an output result, to obtain first-order differential data of the photovoltage, so that both a first-order event signal and the second-order event signal are obtained.

Optionally, the first-order differential voltage may be compared with a first-order comparison threshold, and the first-order event signal may be generated based on a comparison result. For details of the first-order comparison threshold, refer to the foregoing related description of the second-order comparison threshold. Details are not described herein again. The first-order event signal is used as a part of a final output result, to obtain the first-order differential data of the photovoltage, so that the first-order event signal and/or the second-order event signal can be obtained, thereby increasing flexibility of the method.

Optionally, integration may be further performed on the photovoltage, to generate an integral voltage signal. The integral voltage signal is used to generate a frame-based image, to be specific, an image generated by a conventional camera. In addition to the second-order event signal or the first-order event signal, the integral voltage signal is also output, so that a final output can be used to generate both a dynamic vision image and a conventional image. This makes it possible to fuse the two images to improve image quality.

BRIEF DESCRIPTION OF THE DRAWINGS

The following describes the accompanying drawings used in the embodiments of this application.

DETAILED DESCRIPTION OF ILLUSTRATIVE EMBODIMENTS

The following clearly and completely describes the technical solutions in the embodiments of this application with reference to the accompanying drawings in the embodiments of this application.

Figure 1:
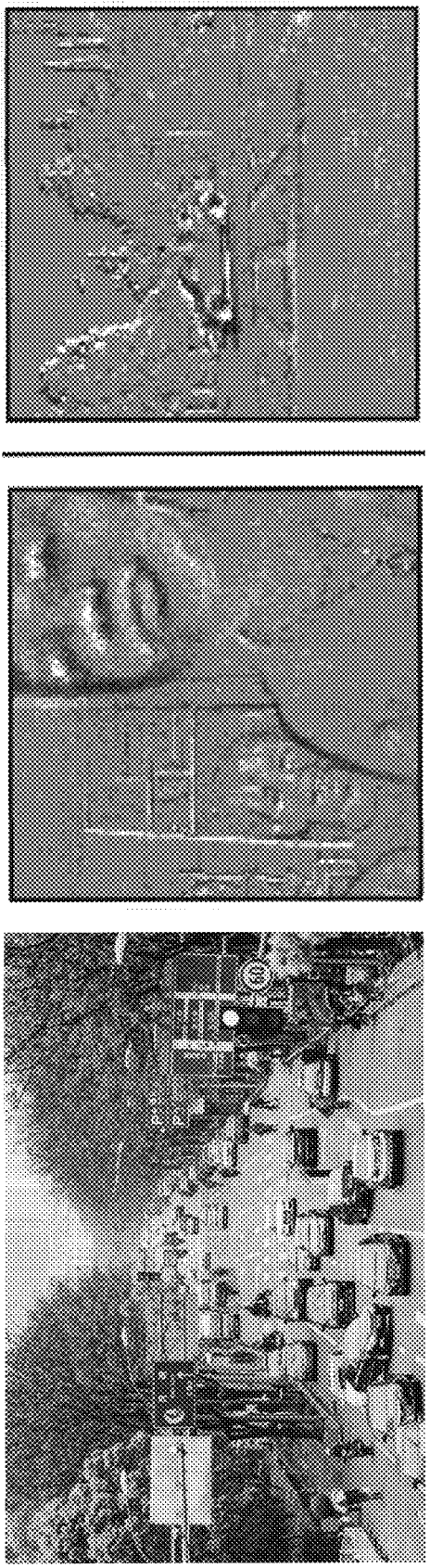
FIG. 1 is a comparison diagram of imaging effects of a DVS camera and a common camera in the conventional technology.
Figure 2:
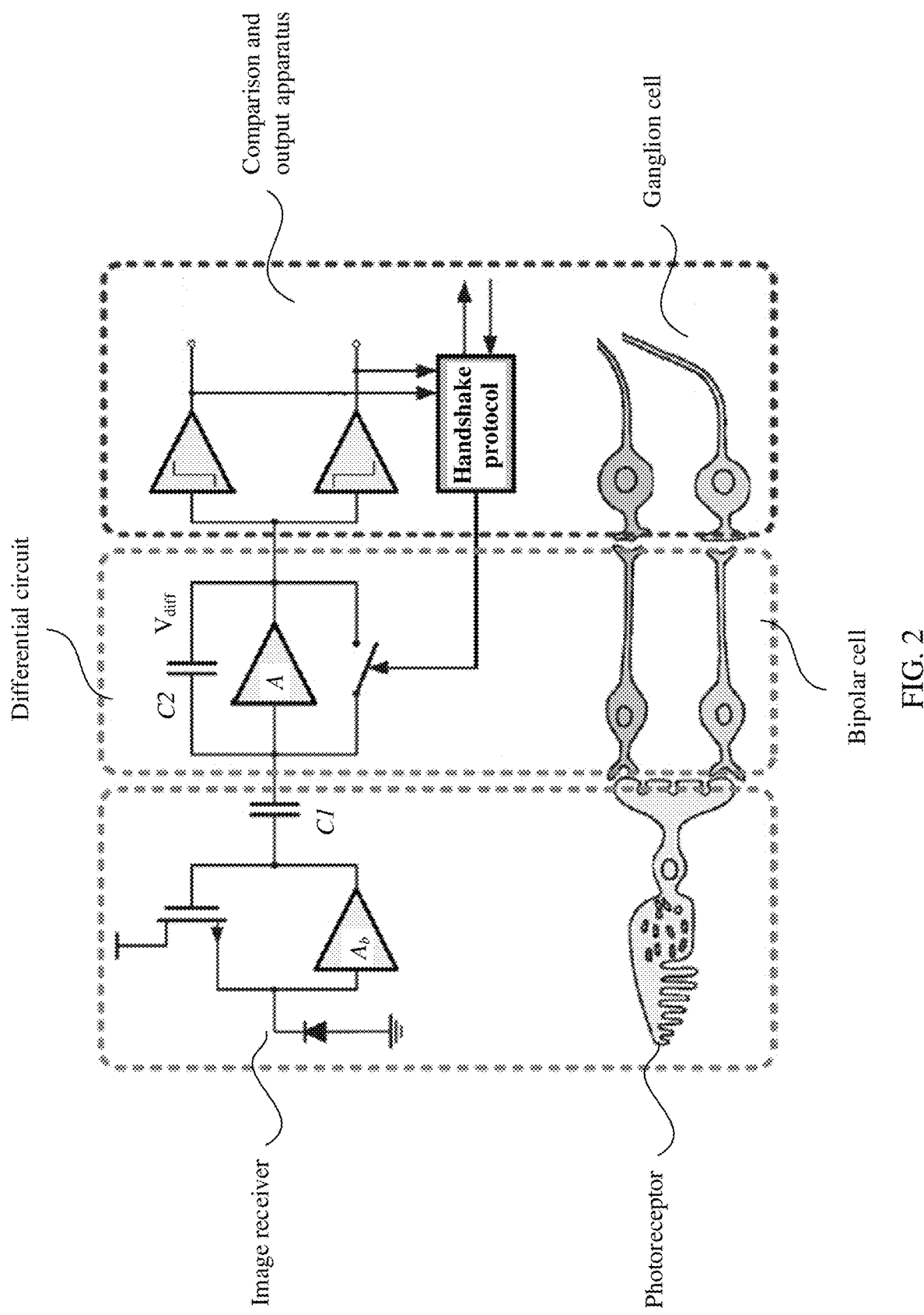
FIG. 2 is a schematic structural diagram of a DVS in the conventional technology.
Figure 3:
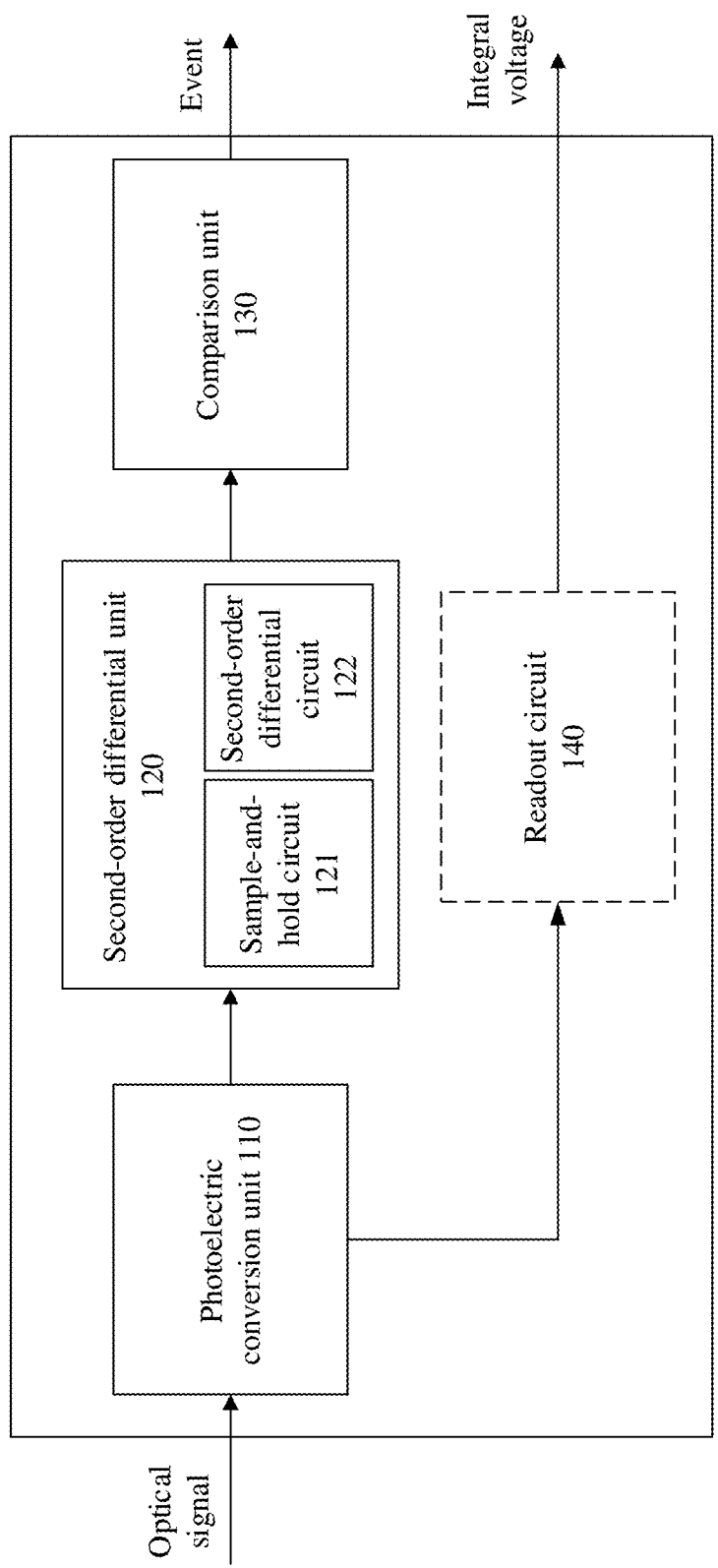
FIG. 3 is a schematic diagram of a logical structure of a dynamic vision sensor.

FIG. 3 is a schematic diagram of a logical structure of a possible embodiment of a dynamic vision sensor according to this application. A dynamic vision sensor 100 includes a photoelectric conversion unit 110, a second-order differential unit 120, and a comparison unit 130. The second-order differential unit includes a sample-and-hold circuit 121 and a second-order differential circuit 122. In some possible implementations, the dynamic vision sensor 100 may further include a readout circuit 140. In some possible implementations, the sample-and-hold circuit 121 may alternatively be considered as a component of the photoelectric conversion unit no. For ease of description, this embodiment is described merely by using an example in which the sample-and-hold circuit 121 belongs to the second-order differential unit 120. It should be noted that, regardless of which functional unit the sample-and-hold circuit is classified into, such a structure division manner falls within the structure protection scope of the technical solutions of this application.

Figure 4:
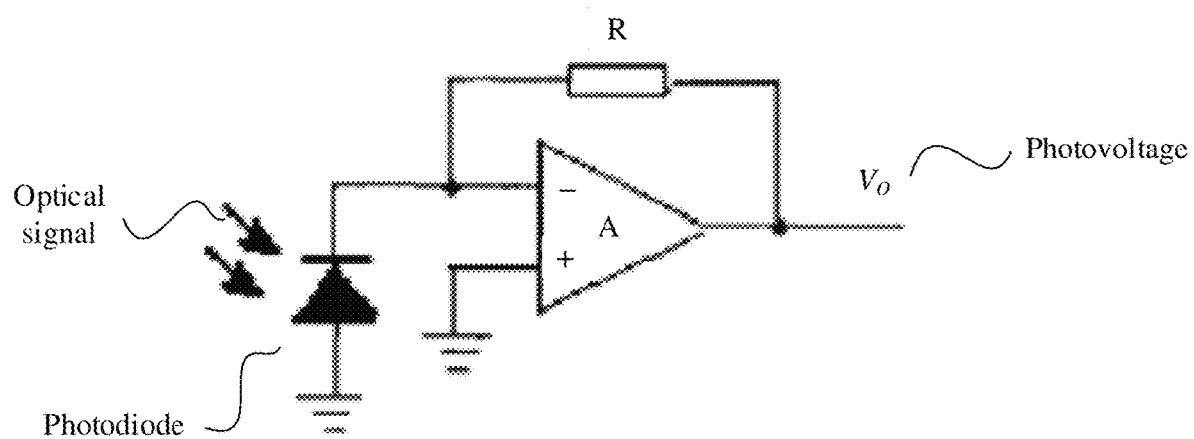
FIG. 4 is a schematic structural diagram of a photoelectric conversion circuit.

The photoelectric conversion unit no is configured to: convert a received optical signal into an electrical signal, to generate a corresponding photovoltage; and send the corresponding photovoltage to the second-order differential unit 120. When the dynamic vision sensor 100 includes the readout circuit 140, the photoelectric conversion unit no further sends the photovoltage to the readout circuit 140. The photoelectric conversion unit no may be constituted by a conventional photoelectric conversion circuit, and is configured to convert a received optical signal into a corresponding electrical signal, that is, a photovoltage. A value of the photovoltage is usually in a linear direct proportion to intensity of light. For a possible implementation of the photoelectric conversion circuit, refer to FIG. 4. The optical signal is input through a photodiode, and is converted into the photovoltage after passing through the typical photoelectric conversion circuit shown in the figure. The photoelectric conversion unit 110 may alternatively be implemented as any other form of apparatus or circuit that has a photoelectric conversion function. This is not limited herein.

The second-order differential unit 120 is configured to perform second-order difference on the photovoltage, to generate a second-order differential voltage. The sample-and-hold circuit 121 is configured to convert the photovoltage into a differential input voltage; and the second-order differential circuit 122 is configured to perform second-order difference on the photovoltage based on the differential input voltage. Generally, the photovoltage is a continuous voltage output by the photoelectric conversion unit no. However, when the second-order differential circuit 122 performs second-order difference, sensing voltages corresponding to a plurality of different moments all need to be used as inputs of the second-order differential circuit 122. Herein, the sensing voltages that correspond to the plurality of different moments and that are all used as the inputs of the second-order differential circuit 122 are referred to as differential input voltages. In this embodiment, an example in which differential input voltages of the second-order differential circuit include photovoltages corresponding to three different moments is used. It should be noted that, in some possible implementations, based on different requirements on a differential order of the photovoltage (for example, third-order difference or fourth-order difference), the differential input voltages may include different quantities of photovoltages at corresponding moments. This is not limited herein.

Figure 5:
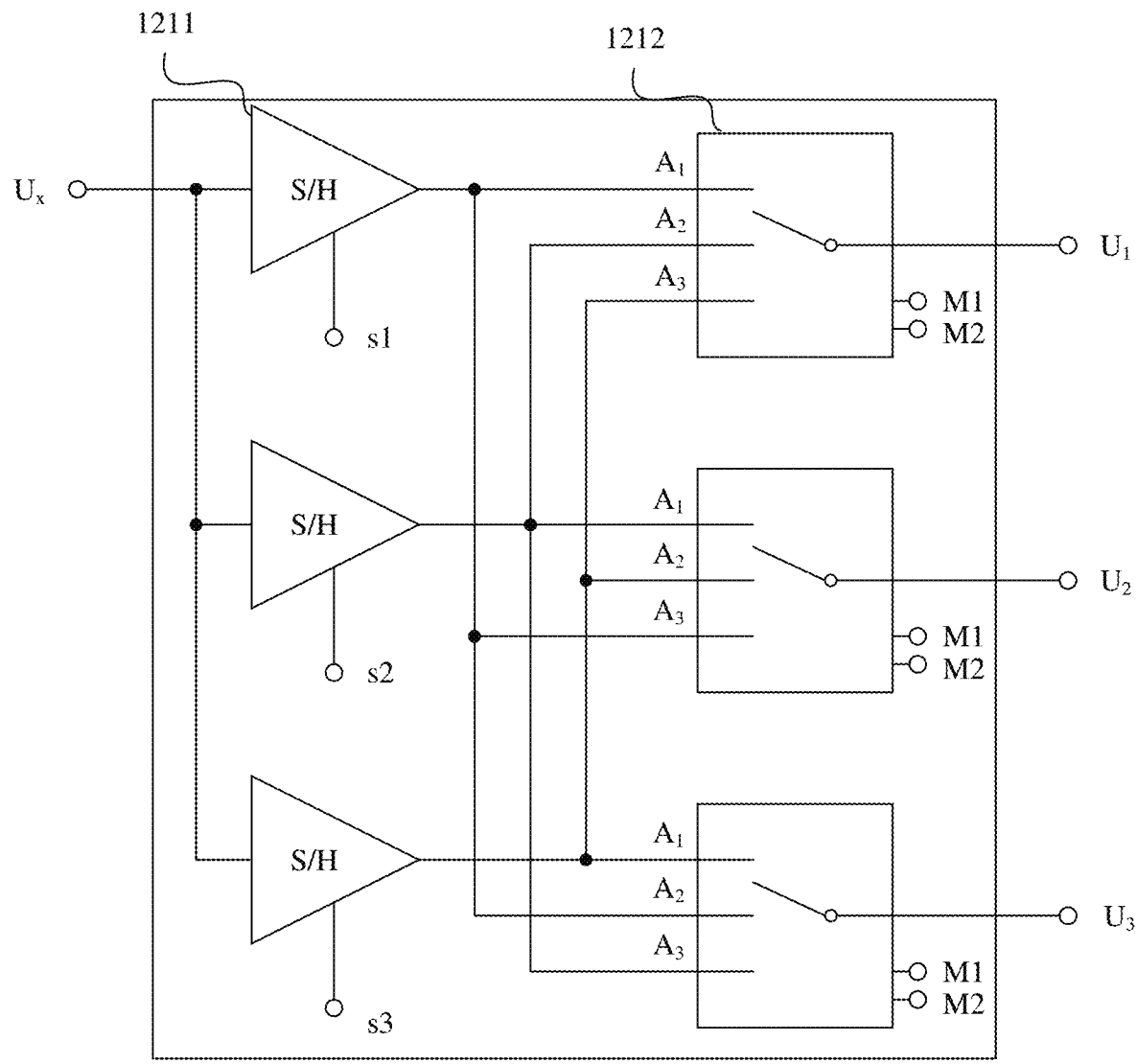
FIG. 5 is a schematic structural diagram of a sample-and-hold circuit.
Figure 6:
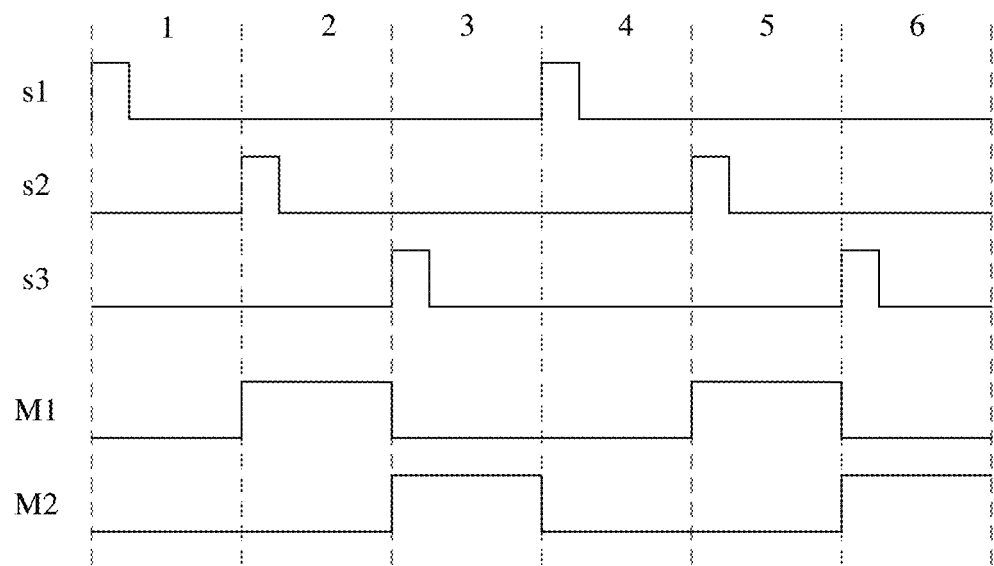
FIG. 6 is a schematic diagram of time sequence control of a sample-and-hold circuit.

For a possible implementation of the sample-and-hold circuit 121, refer to FIG. 5. The sample-and-hold circuit 121 includes three sample-and-hold devices 1211, where each of the three sample-and-hold devices 1211 is configured to hold, for a period of time, an input voltage obtained by the sample-and-hold device 1211, and includes three selectors 1212, where each of the three selectors 1212 is configured to select, for output, one of three inputs $A_1$, $A_2$, and $A_3$ corresponding to the selector 1212. A continuous input of the photovoltage is $U_x$, and the three voltages included in the differential input voltages are output voltages $U_1$, $U_2$, and $U_3$ of the three selectors. s1, s2, and s3 are time sequence control inputs of the three sample-and-hold devices, and M1 and M2 are time sequence control inputs of the selector. FIG. 6 shows a time sequence control manner that can be used by the sample-and-hold circuit 121. The timing diagram in FIG. 6 shows two cycles of time sequence control. The cycle can be continuously cycled during the use of the circuit during actual application. A working principle of the sample-and-hold circuit is described by using an example. When the time sequence control manner shown in FIG. 6 is used, for example, when the sample-and-hold device s3 and all switches $A_1$ are turned on at an initial moment, $U_1$, $U_2$, and $U_3$ have initial voltages. At a moment 1, the sample-and-hold device s1 and all switches $A_2$ are turned on, so that an original voltage at $U_3$ is output to $U_2$, an original voltage at $U_2$ is output to $U_1$, and $U_x$ at the moment 1 is output to $U_3$. At a moment 2, the sample-and-hold device s2 and all switches $A_3$ are turned on, so that an original voltage at $U_3$ is output to $U_2$, an original voltage at $U_2$ is output to $U_1$, and $U_x$ at the moment 2 is output to $U_3$. At a moment 3, the sample-and-hold device s3 and all the switches $A_1$ are turned on, so that an original voltage at $U_3$ is output to $U_2$, an original voltage at $U_2$ is output to $U_1$, and $U_x$ at the moment$_3$ is output to $U_3$. The rest may be deduced by analogy. In some possible implementations, the sample-and-hold circuit may alternatively use any other form of circuit that has a sample-and-hold function, for example, a capacitor, or a digital phase shifter implementing a phase delay function. This is not limited herein.

Figure 7:
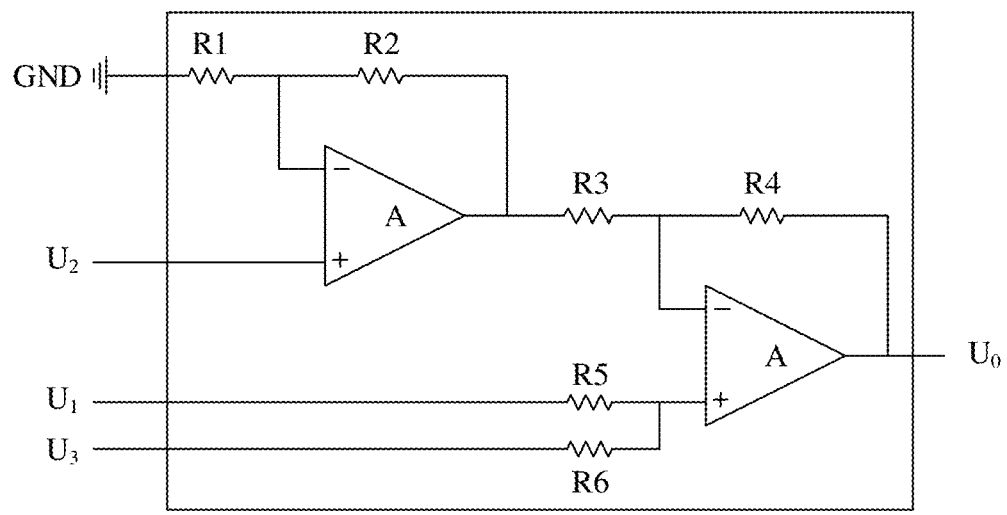
FIG. 7 is a schematic structural diagram of a second-order differential circuit.

For a possible implementation of the second-order differential circuit 122, refer to FIG. 7. In the figure, $U_1$, $U_2$, and $U_3$ are differential input voltages, GND is a ground point, and $U_0$ is the second-order differential voltage. After the differential input voltages $U_1$, $U_2$, and $U_3$ are input to the second-order differential circuit shown in the figure, the second-order differential voltage $U_0$ is output. A relationship between $U_0$ and $U_1$, $U_2$, and $U_3$ satisfies the following equation:

$$U_0 = \frac{R6}{R5+R6}\left(1+\frac{R4}{R3}\right)U_1 + \frac{R5}{R5+R6}\left(1+\frac{R4}{R3}\right)U_3 - \frac{R4}{R3}\left(1+\frac{R2}{R1}\right)U_2$$

Generally, all resistors in the circuit shown in the figure use a same resistance (for example, 10 kilo ohms). In this case, $U_0=U_3-2U_2+U_1$.

Figure 8:
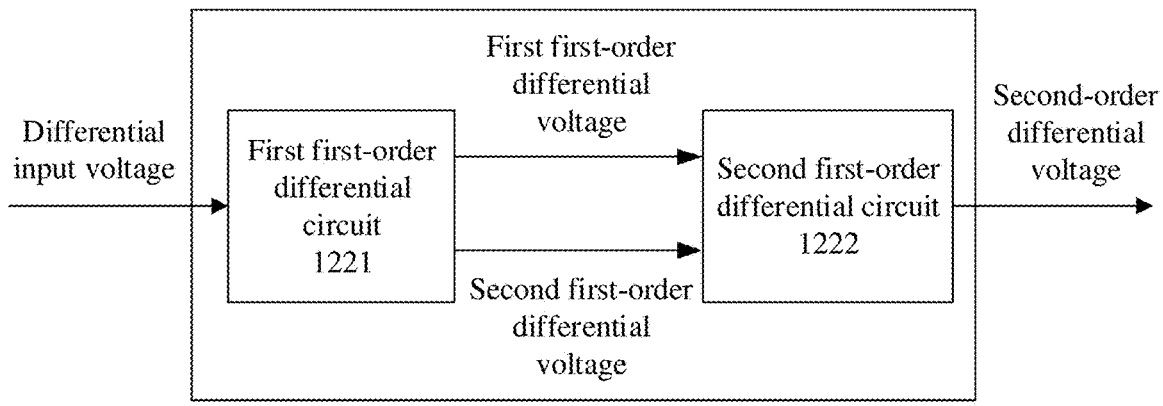
FIG. 8 is a schematic diagram of a logical structure of another second-order differential circuit.
Figure 9:
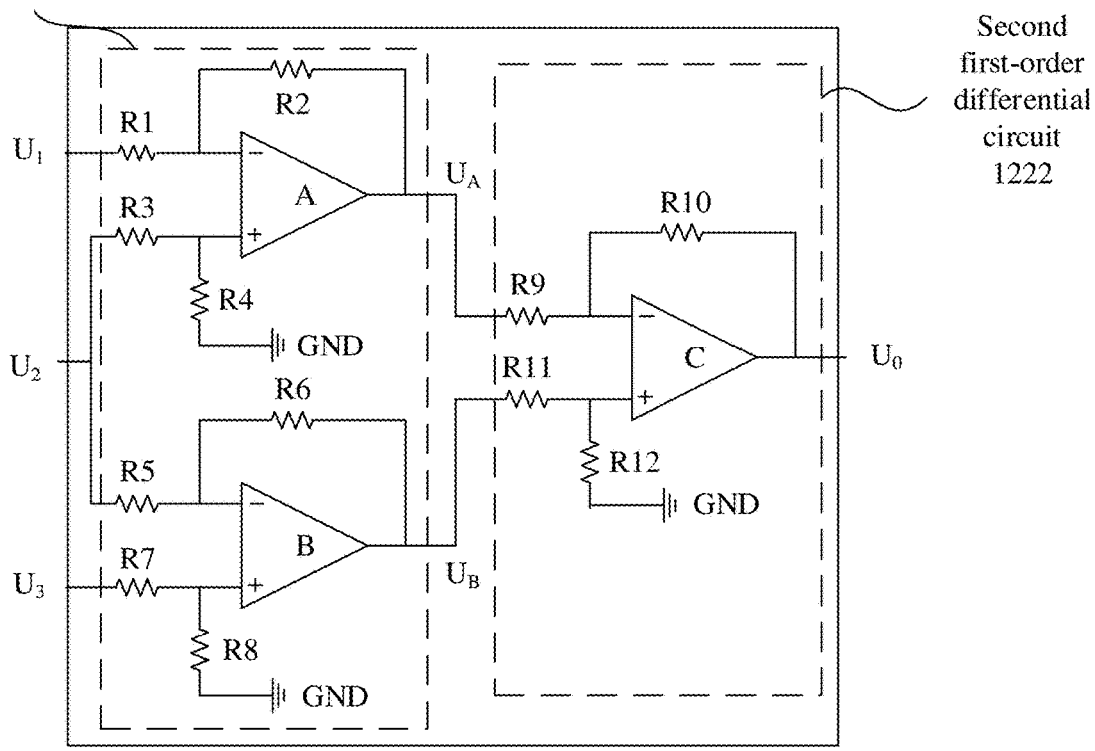
FIG. 9 is a schematic structural diagram of another second-order differential circuit.

For another possible implementation of the second-order differential circuit 122, refer to FIG. 8 and FIG. 9. FIG. 8 is a schematic diagram of a logical structure of an implementation of the second-order differential circuit. The second-order differential circuit 122 includes a first first-order differential circuit 1221 and a second first-order differential circuit 1222. The first first-order differential circuit and the second first-order differential circuit are connected in series. The first first-order differential circuit 1221 receives the differential input voltage, and generates a first first-order differential voltage and a second first-order differential voltage based on the differential input voltage. The second first-order differential circuit generates the second-order differential voltage based on the first first-order differential voltage and the second first-order differential voltage. FIG. 9 is a circuit diagram of an implementation of the second-order differential circuit. In the figure, $U_1$, $U_2$, and $U_3$ are differential input voltages, GND is a ground point, and $U_0$ is the output second-order differential voltage. The first first-order differential circuit 1221 generates a first first-order differential voltage $U_A$ and a second first-order differential voltage $U_B$ based on $U_1$, $U_2$, and $U_3$. The second first-order differential circuit 1222 generates the second-order differential voltage $U_0$ based on $U_A$ and $U_B$. A relationship between $U_A$ and $U_B$ and $U_1$, $U_2$, and $U_3$ satisfies the following formula:

$$U_A = \frac{R4}{R3+R4}\left(1+\frac{R2}{R1}\right)U_2 - \frac{R2}{R1}U_1$$

$$U_B = \frac{R8}{R7+R8}\left(1+\frac{R6}{R5}\right)U_3 - \frac{R6}{R5}U_2$$

A relationship between $U_0$ and $U_A$ and $U_B$ satisfies the following formula:

$$U_0 = \frac{R12}{R11+R12}\left(1+\frac{R10}{R9}\right)U_B - \frac{R10}{R9}U_A$$

Generally, all resistors in the circuit shown in the figure use a same resistance (for example, 10 kilo ohms). In this case, $U_0=U_3-2U_2+U_1$.

It can be learned from the relationship between the second-order differential voltage and the differential input voltage that, if $U_3$ is a photovoltage at a current moment, when a change speed of the photovoltage at the current moment is different from a change speed of a photovoltage at a previous moment, the second-order differential circuit 122 generates a positive voltage or a negative voltage, that is, a non-zero second-order differential voltage; or when the change speed of the photovoltage at the current moment is the same as the change speed of the photovoltage at the previous moment, an output voltage of the second-order differential circuit 122 is 0, that is, a zero second-order differential voltage is generated.

The comparison unit 130 is configured to compare the second-order differential voltage with a second-order comparison threshold, and generate a second-order event signal based on a comparison result. The comparison unit 130 may be implemented as any apparatus that can compare voltages and output a signal based on a comparison result, for example, including but not limited to a window comparator or a dedicated voltage comparison chip. The second-order comparison threshold may include a positive second-order comparison threshold and a negative second-order comparison threshold. The positive second-order comparison threshold may be set to positive 300 millivolts, and the negative second-order comparison threshold may be set to negative 300 millivolts. Alternatively, the positive and negative thresholds may be asymmetrically set. This is not limited herein. The comparison unit 130 may output a positive pulse when the second-order differential voltage is greater than or equal to the positive second-order comparison threshold, may output a negative pulse when the second-order differential voltage is less than or equal to the negative second-order comparison threshold, or may output a zero pulse when the second-order differential voltage is less than the positive second-order comparison threshold and greater than the negative second-order comparison threshold. In some possible implementations, the second-order comparison threshold may alternatively be only a positive threshold, and a positive pulse is generated only when the second-order differential voltage is greater than the positive threshold. Alternatively, the second-order comparison threshold is only a negative threshold, and a negative pulse is generated only when the second-order differential voltage is less than the negative threshold. This is not limited herein.

The readout circuit 140 is configured to generate an integral voltage signal based on the received photovoltage. The readout circuit performs integration on the received photovoltage, and outputs the integral voltage signal based on an integration result within a period of time (for example, one millisecond). The readout circuit 140 may be constituted by a transistor. The integral voltage signal generated by the readout circuit 140 is used to generate a frame-based (frame-based) image.

In some possible implementations, when the second-order differential circuit 122 uses the structure shown in FIG. 9, the first first-order differential voltage $U_A$ and the second first-order differential voltage $U_B$ that are generated by the first first-order differential circuit 1221 may be directly sent to the comparison unit 130. The comparison unit 130 may be further configured to compare $U_A$ and/or $U_B$ with a first-order differential threshold, and generate a first-order event signal based on a comparison result. For a specific manner of generating the first-order event signal, refer to the foregoing description of the manner of generating the second-order event signal and the related description in the summary. Details are not described herein again.

Figure 10:
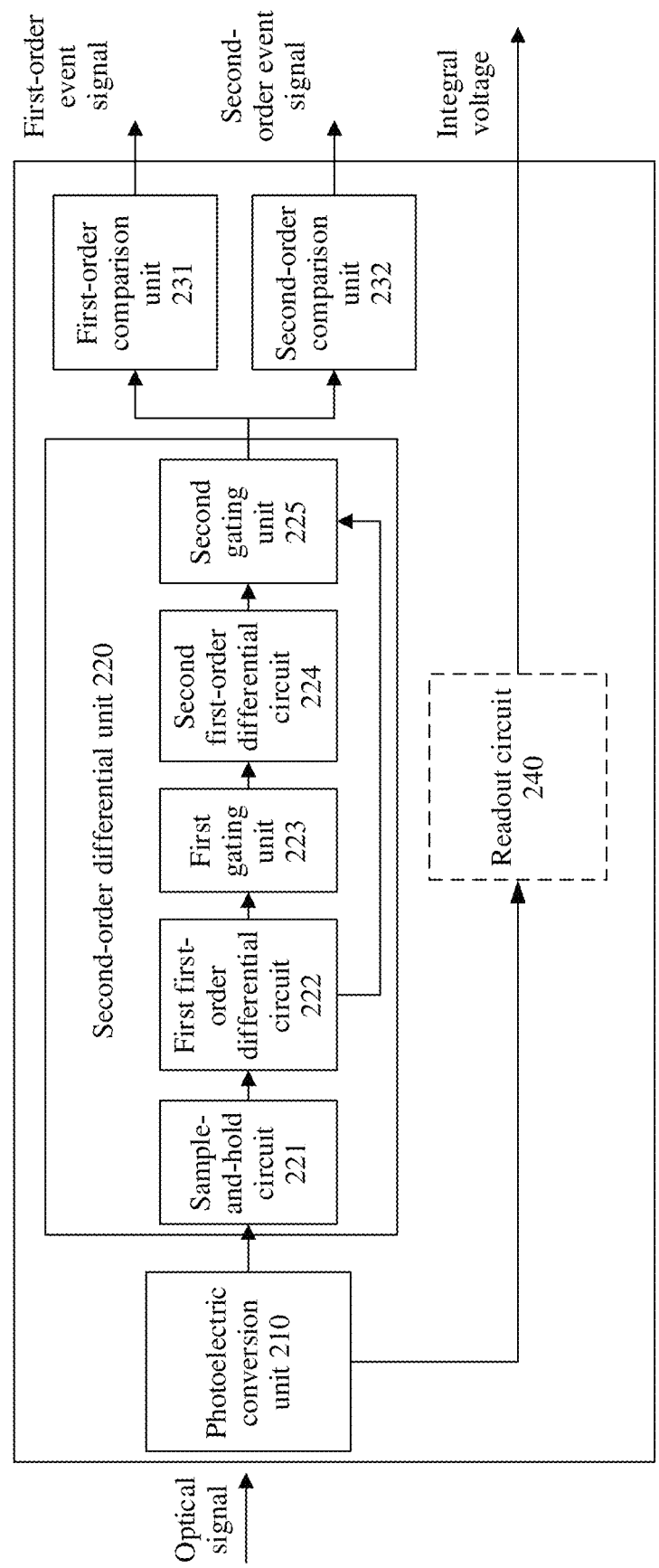
FIG. 10 is a schematic diagram of a logical structure of another dynamic vision sensor.

FIG. 10 is a schematic diagram of a logical structure of another possible embodiment of a dynamic vision sensor according to this application. A dynamic vision sensor 200 includes a photoelectric conversion unit 210, a second-order differential unit 220, a first-order comparison unit 231, and a second-order comparison unit 232. The second-order differential unit includes a sample-and-hold circuit 221, a first first-order differential circuit 222, a first gating unit 223, a second first-order differential circuit 224, and a second gating unit 225. In some possible implementations, the dynamic vision sensor may further include a readout circuit 240. In some possible implementations, the sample-and-hold circuit 221 may alternatively be considered as a component of the photoelectric conversion unit 210. For ease of description, this embodiment is described merely by using an example in which the sample-and-hold circuit 221 belongs to the second-order differential unit 220. It should be noted that, regardless of which functional unit the sample-and-hold circuit is classified into, such a structure division manner falls within the structure protection scope of the technical solutions of this application.

For details of the photoelectric conversion unit 210, refer to the description of the photoelectric conversion unit no in FIG. 3. Details are not described herein again.

The second-order differential unit 220 is configured to perform second-order difference on a photovoltage, to generate a second-order differential voltage. The sample-and-hold circuit 221 is configured to convert the photovoltage into a differential input voltage. Generally, the photovoltage is a continuous voltage output by the photoelectric conversion unit 210, and for the first first-order differential circuit 222, photovoltages corresponding to a plurality of different moments all need to be used as inputs. In this embodiment, an example in which differential input voltages of the first first-order differential circuit 222 include photovoltages corresponding to three different moments is used. The photovoltages corresponding to the three different moments are provided by the sample-and-hold circuit 221. For a specific providing manner, refer to the corresponding descriptions in FIG. 5 and FIG. 6. Details are not described herein again. It should be noted that, in some possible implementations, based on different requirements on a differential order of the photovoltage, the differential input voltages may include different quantities of photovoltages at corresponding moments. For example, in a case of third-order difference, the differential input voltages may include photovoltages at five corresponding moments. This is not limited herein. The first first-order differential circuit 222 receives the differential input voltage, and generates a first first-order differential voltage and a second first-order differential voltage based on the differential input voltage. The first gating unit 223 determines whether to perform first-order difference for the second time. When a determining result is to perform first-order difference for the second time, the second first-order differential circuit generates the second-order differential voltage based on the first first-order differential voltage and the second first-order differential voltage; and the first first-order differential voltage and the second first-order differential voltage are also sent to the second gating unit. When a determining result is not to perform first-order difference for the second time, the first first-order differential voltage and the second first-order differential voltage are directly sent to the second gating unit. For a specific manner of generating the first first-order differential voltage, the second first-order differential voltage, and the second-order differential voltage, refer to the descriptions in FIG. 8 and FIG. 9. Details are not described herein again. The first gating unit 223 is configured to control whether to perform first-order difference on the photovoltage for the second time. A control condition may be determining whether a camera is moving. If it is determined that the camera is moving, first-order difference is to be performed for the second time. If it is determined that the camera is stationary, first-order difference is not to be performed for the second time. The second gating unit 225 is configured to: when both a first-order differential voltage and the second-order differential voltage are used as inputs, output the first-order differential voltage to the first-order comparison unit 231 and/or output the second-order differential voltage to the second-order comparison unit 232 after gating. When only the first-order differential voltage or only the second-order differential voltage is used as an input, the second gating unit 225 outputs the received voltage to a corresponding comparison unit. The first gating unit and the second gating unit each may be specifically implemented in a form of a multiplexer, a matrix switch, or the like. This is not limited herein.

The first-order comparison unit 231 is configured to compare the received first-order differential voltage with a first-order differential threshold, and generate a first-order event signal based on a comparison result. The second-order comparison unit 232 is configured to compare the received second-order differential voltage with a second-order comparison threshold, and generate a second-order event signal based on a comparison result. For details of the first-order comparison unit 231 and the second-order comparison unit 232, refer to the related description of the comparison unit 130 in FIG. 3. Details are not described herein again.

For details of the readout circuit 240, refer to the related description in FIG. 3. Details are not described herein again.

In some possible implementations, the second-order differential unit 220 may include more first-order differential circuits and gating units, to implement further multi-order difference on the photovoltage. For a specific implementation principle, refer to the corresponding description in FIG. 10. Details are not described herein again.

Figure 11:
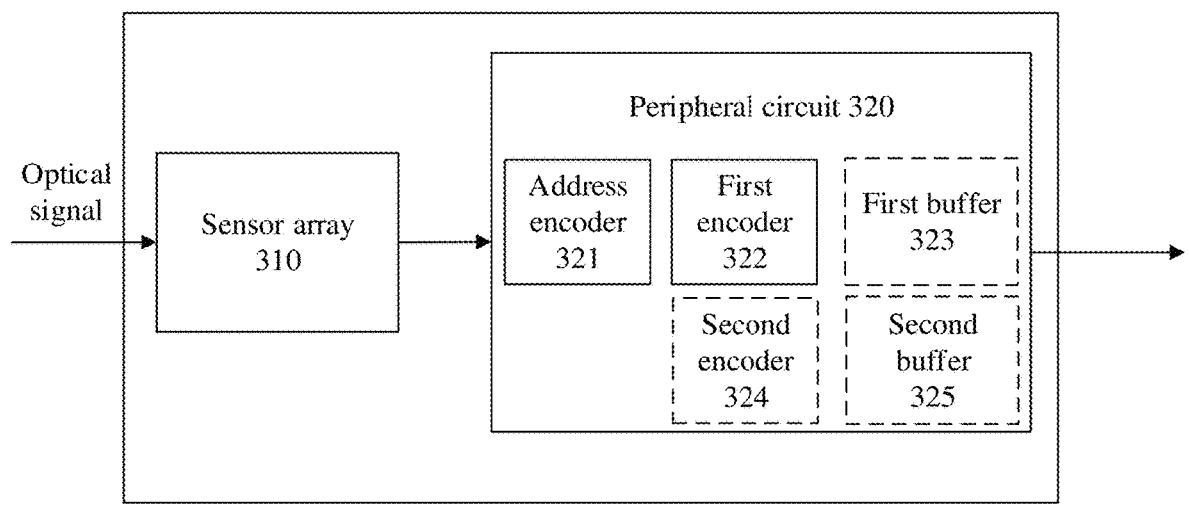
FIG. 11 is a schematic diagram of a logical structure of a dynamic vision sensing apparatus.

FIG. 11 is a schematic diagram of a logical structure of a possible embodiment of a dynamic vision sensing apparatus according to this application. A dynamic vision sensing apparatus 300 includes a sensor array 310 and a peripheral circuit 320. The peripheral circuit 320 includes an address encoder 321 and a first encoder 322. In some possible implementations, the peripheral circuit 320 further includes a first buffer 323. In some possible implementations, the peripheral circuit 320 further includes a second encoder 324 and a second buffer 325.

The sensor array 310 includes a plurality of dynamic vision sensors described in the embodiments of this application. The dynamic vision sensor in the sensor array 310 is configured to generate a second-order event signal or a first-order event signal based on an optical signal. For a specific generation manner, refer to the related descriptions in FIG. 3 to FIG. 10. Details are not described herein again. Herein, the second-order event signal and the first-order event signal are collectively referred to as an event signal.

The peripheral circuit 320 is configured to generate an address event representation based on the event signal. Specifically, the sensor array 310 sends the event signal to the address encoder 321, and the address encoder 321 sends, together with the event signal to the first encoder 322, coordinates of the sensor that generates the event signal.

The first encoder 322 is configured to: generate the address event representation based on the received event signal and coordinates, and encode the address event representation to generate binary code information. In some possible implementations, the peripheral circuit 320 further includes a first buffer 323, configured to store the address event representation encoded by the first encoder 322, for an external device to invoke. In some possible implementations, the first buffer 323 may be further configured to store information output by the address encoder 321. This is not limited herein.

In some possible implementations, the peripheral circuit 320 further includes a second encoder 324 and a second buffer 325. The second encoder is configured to receive and encode an integral voltage signal sent by the sensor array, to generate binary code information, for the external device to invoke. The binary code information generated based on the integral voltage signal may be used to generate a frame-based image. The second buffer 325 may be configured to store information generated through encoding by the second encoder 324.

Figure 12:
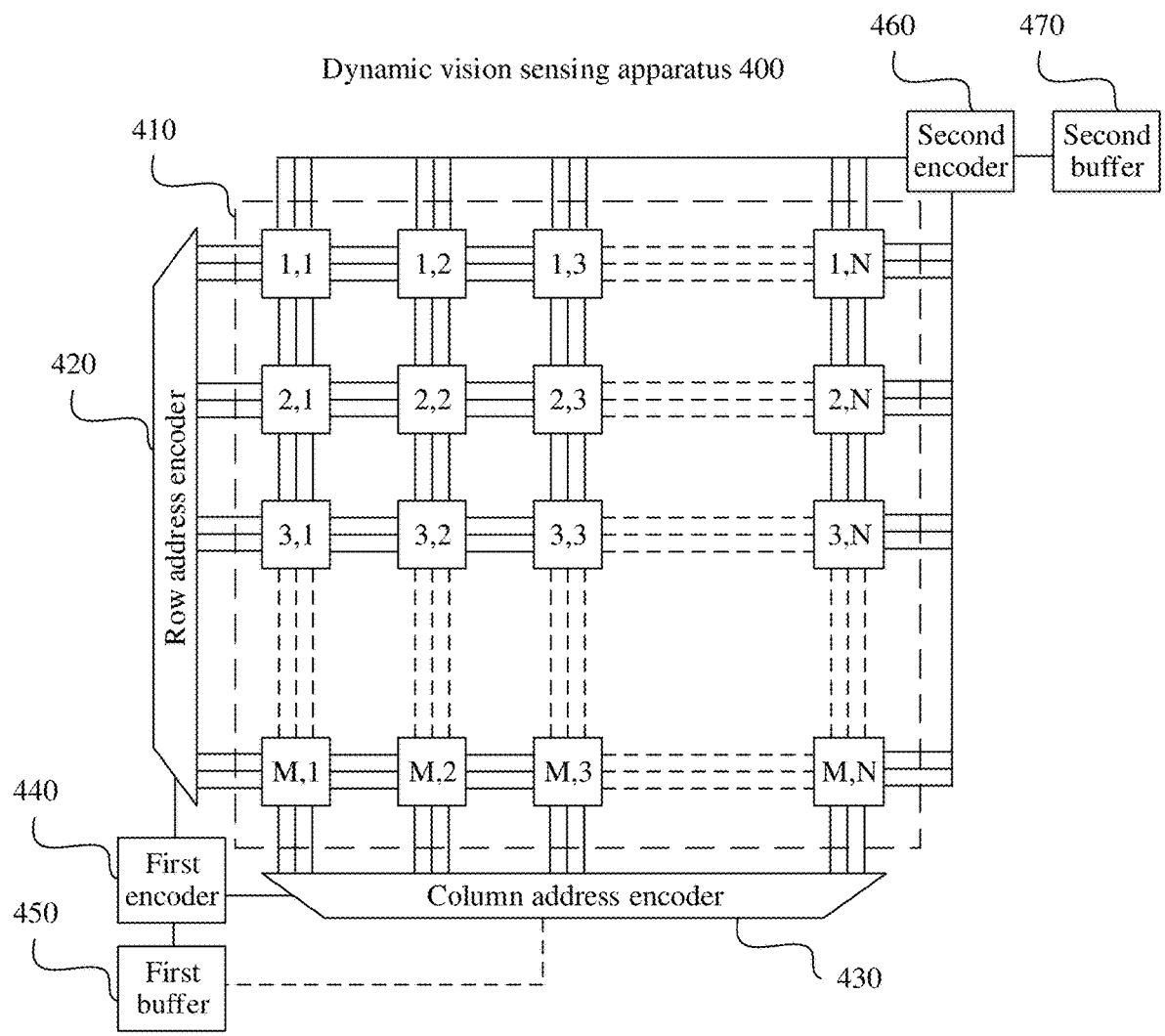
FIG. 12 is a schematic structural diagram of a dynamic vision sensing apparatus.

FIG. 12 is a schematic structural diagram of another possible embodiment of a dynamic vision sensing apparatus according to this application. A dynamic vision sensing apparatus 400 includes a sensor array 410, a row address encoder 420, a column address encoder 430, a first encoder 440, and a first buffer 450. In some possible implementations, a second encoder 460 and a second buffer 470 may be further included.

The sensor array 410 includes a plurality of dynamic vision sensors described in the embodiments of this application. The dynamic vision sensor in the sensor array 410 is configured to generate an event signal based on an optical signal. For a specific generation manner, refer to the related descriptions in FIG. 3 to FIG. 10. Details are not described herein again. The event signal includes a second-order event signal and a first-order event signal. The sensor in the sensor array 410 sends the event signal to both the row address encoder 420 and the column address encoder 430.

The row address encoder 420 is configured to: after receiving the event signal sent by the sensor, send, together with the event signal to the first encoder 440, a row coordinate of the sensor that generates the event signal. The column address encoder 430 is configured to: after receiving the event signal sent by the sensor, send, together with the event signal to the first encoder 440, a column coordinate of the sensor that generates the event signal.

The first encoder 440 is configured to: generate an address event representation based on the received event signal and coordinates, and encode the address event representation to generate binary code information.

The first buffer 450 is configured to store the address event representation encoded by the encoder, for an external device to invoke. The first buffer 450 is further configured to store information output by the column address encoder 430. In some possible implementations, the first buffer 450 may be further configured to store information output by the row address encoder 420. This is not limited herein.

The second encoder 460 is configured to receive and encode an integral voltage signal sent by the sensor array, to generate binary code information, for the external device to invoke. The binary code information generated based on the integral voltage signal may be used to generate a frame-based image. The second buffer 470 may be configured to store information generated through encoding by the second encoder 460.

The dynamic vision sensing apparatus described in FIG. 11 or FIG. 12, or another dynamic vision sensing apparatus including the dynamic vision sensors described in FIG. 3 to FIG. 10, in actual use, may generate, based on event signals accumulated within a period of time (for example, three milliseconds), outputs corresponding to the sensors that generate these event signals; or may generate outputs based on a preset proportion of sensors that generate event signals (for example, when more than 80% of sensors in a row or column output event signals, generate a pulse output of the row or column). It should be noted that the event signal herein may be a first-order event signal or a second-order event signal. The first-order event signal may be considered as an event signal that represents a light intensity change, and the second-order event signal may be considered as an event signal that represents a change of a light intensity change speed. When each sensor in the sensor array corresponds to one pixel in a camera, if an event signal generated by the sensor is a second-order event signal, information photographed by the camera records a second-order derivative image of a light intensity change relative to time, to be specific, a photographed image records a change amount of a light change speed of each pixel in the entire image. In this way, when the camera is moving, because light in a background usually changes at a constant speed relative to the camera, background information is reduced, and the image mainly retains information whose light change speed changes (for example, an object that suddenly enters the image). This reduces redundant background information caused by motion of the camera. Specifically, if the camera is installed on a moving vehicle, stationary trees and parked vehicles on the roadside may be filtered out, and an overtaking vehicle, a falling stone, and the like may be captured, to achieve a better photographing effect.

Figure 13:
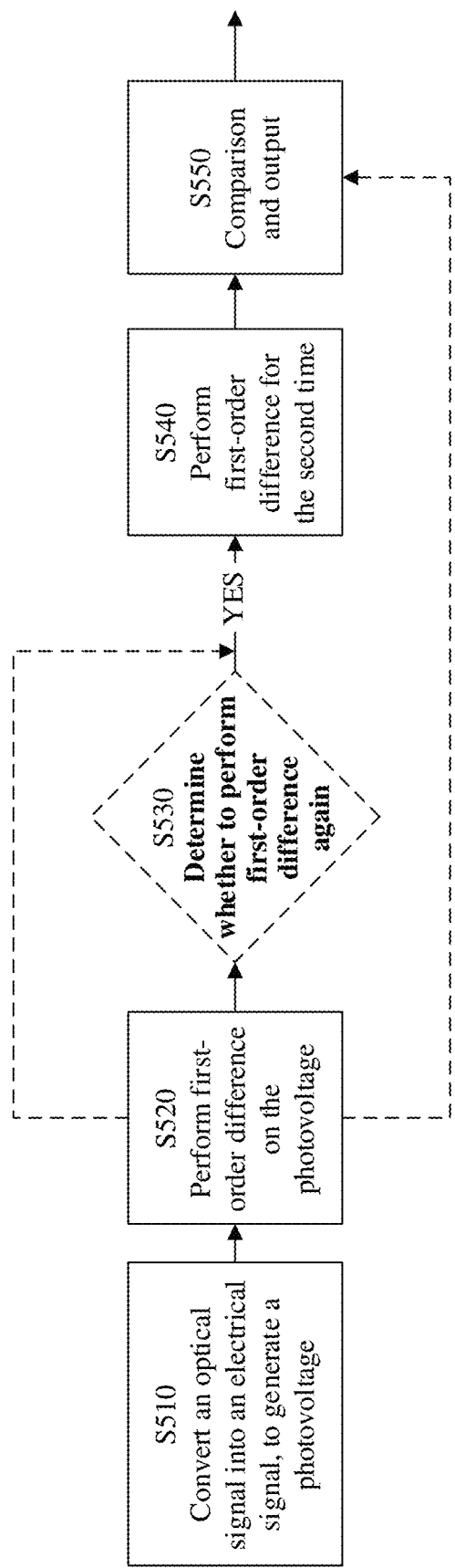
FIG. 13 is a schematic flowchart of a dynamic vision sensing method.

FIG. 13 is a possible schematic flowchart of a dynamic vision sensing method according to this application.

S510. Convert an optical signal into an electrical signal, to generate a photovoltage. The optical signal may be converted into the electrical signal by using a photoelectric conversion apparatus, and the electrical signal is used as an input of a differential operation. For a specific manner, refer to the related descriptions in the summary and the embodiments. Details are not described herein again.

S520. Perform first-order difference on the photovoltage. First-order difference is performed on the photovoltage, to obtain a first-order differential voltage. For a specific manner, refer to the related descriptions in the summary and the embodiments. Details are not described herein again.

S530. Determine whether to perform first-order difference again. First-order difference is performed on the first-order differential voltage obtained in S520, to obtain a second-order differential voltage of the photovoltage. The first-order differential voltage represents a change of light, and the second-order differential voltage represents a change of a light change speed. Whether to perform first-order difference for the second time may be determined based on different application scenario requirements. For example, when a sensor is moving, first-order difference is to be performed for the second time; or when a sensor is stationary, first-order difference is not to be performed for the second time.

S540. Perform first-order difference for the second time. When it is determined in S530 that first-order difference is to be performed again, first-order difference is performed on the first-order differential voltage obtained in S520. For a specific manner, refer to the related descriptions in the summary and the embodiments. Details are not described herein again. In some possible implementations, after S520, S540 may alternatively be directly performed without determining in S530. To be specific, first-order difference is directly performed, for the second time without determining, on the first-order differential voltage generated in S520. This is not limited herein.

S550. Compare the differential voltage with a threshold, and output a comparison result. When the first-order differential voltage generated in S520 is received, the first-order differential voltage is compared with a first-order comparison threshold, and a first-order event signal is generated based on a comparison result. When the second-order differential voltage generated in S540 is received, the second-order differential voltage is compared with a second-order comparison threshold, and a second-order event signal is generated. For a specific method for generating the first-order event signal and the second-order event signal, refer to the related description of the comparison unit 130 in FIG. 3. Details are not described herein again.

Figure 14:
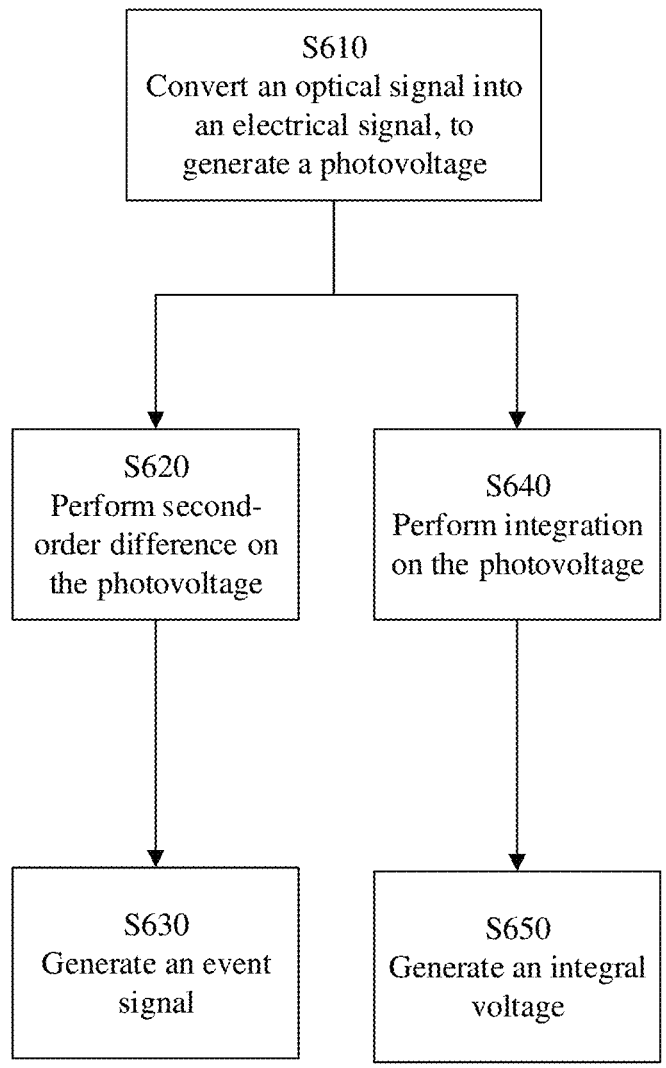
FIG. 14 is a schematic flowchart of another dynamic vision sensing method.

FIG. 14 is another possible schematic flowchart of a dynamic vision sensing method according to this application.

S610. Convert an optical signal into an electrical signal, to generate a photovoltage.

S620. Perform second-order difference on the photovoltage, to generate a second-order differential voltage.

S630. Generate a second-order event signal based on the second-order differential voltage. For specific processes of S610, S620, and S630, refer to the related descriptions in FIG. 13. Details are not described herein again.

S640. Perform integration on the photovoltage.

S650. Generate an integral voltage signal based on an integration result within a period of time. The integral voltage signal is used to generate a frame-based (frame-based) image.

Figure 15:
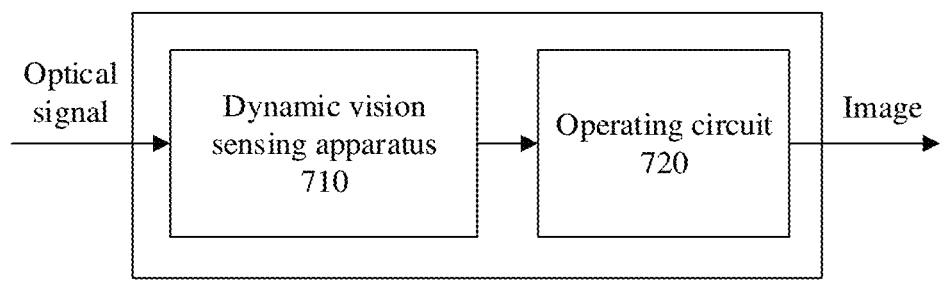
FIG. 15 is a schematic diagram of a logical structure of a dynamic vision camera.

FIG. 15 is a schematic diagram of a logical structure of an embodiment of a dynamic vision camera using a dynamic vision sensing apparatus according to this application. A dynamic vision camera 700 includes a dynamic vision sensing apparatus 710 and an operating circuit 720. The dynamic vision sensing apparatus 710 is configured to generate an address event representation based on an optical signal. For a specific generation manner, refer to the specific descriptions in the summary and the embodiments. Details are not described herein again. The operating circuit 720 is configured to generate an image based on the address event representation. The operating circuit 720 may be implemented in a form of a processor, a chip, or the like. This is not limited herein.

Figure 16:
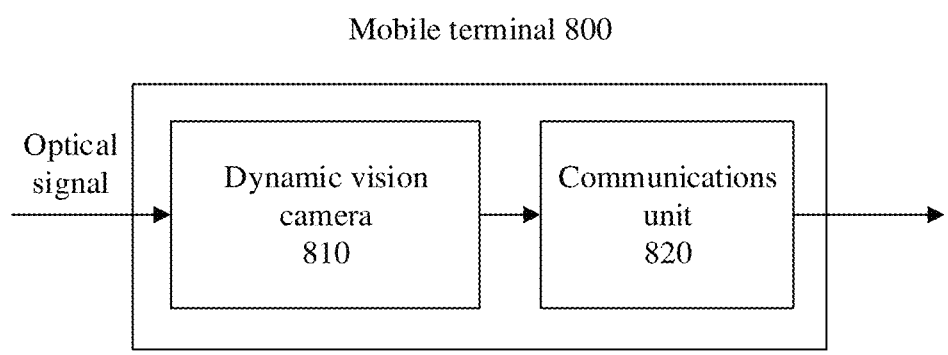
FIG. 16 is a schematic diagram of a logical structure of a mobile terminal.

FIG. 16 is a schematic diagram of a logical structure of an embodiment of a mobile terminal deceive using a dynamic vision sensing apparatus according to this application. A mobile terminal 800 includes a dynamic vision camera 810 and a communications unit 820. The dynamic vision camera 810 is configured to generate an image based on an optical signal. For a specific generation manner, refer to FIG. 15. Details are not described herein again. The communications unit 820 is configured to send the image to another device. The communications unit may be a radio signal transmitting apparatus, a transmission port, or the like. This is not limited herein.

Figure 17:
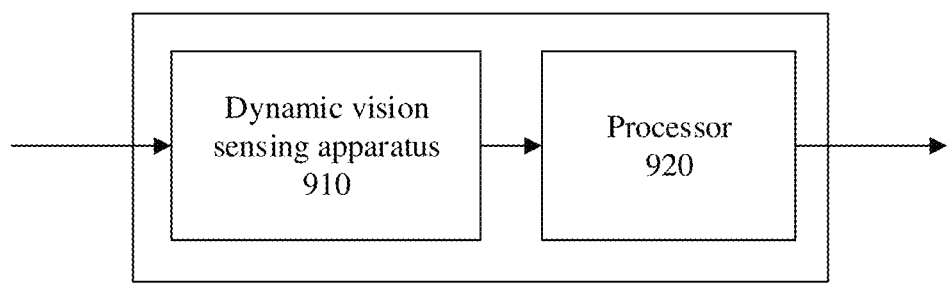
FIG. 17 is a schematic diagram of a logical structure of a simultaneous localization and mapping system.

FIG. 17 is a schematic diagram of a logical structure of an embodiment of a simultaneous localization and mapping system using a dynamic vision sensing apparatus according to this application. A simultaneous localization and mapping system 900 includes a dynamic vision sensing apparatus 910 and an operating circuit 920. The dynamic vision sensing apparatus 910 is configured to generate an address event representation based on an optical signal. For a specific generation manner, refer to the foregoing specific description. Details are not described herein again. The operating circuit 920 is configured to perform scene recognition based on the address event representation.

An operating circuit in one or more embodiments may use at least one of electronic units such as an application-specific integrated circuit (application specific integrated circuit, ASIC), a digital signal processor (digital signal processor, DSP), a programmable logic device (programmable logic device, PLD), a field programmable gate array (field programmable gate array, FPGA), a processor, a controller, a microcontroller and/or a microprocessor, to implement implementations of this application.

In one or more embodiments, the described functions may be implemented by hardware, software, firmware, or any combination thereof. If the functions are implemented by software, the functions may be stored as one or more instructions or code in a computer-readable medium or sent by a computer-readable medium, and are executed by a hardware-based processing unit.

It should be understood that "one embodiment", "an embodiment", or "some possible implementations" mentioned throughout this specification means that particular features, structures, or characteristics related to the embodiments are included in at least one embodiment of this application. Therefore, "in one embodiment", "in an embodiment", or "in some possible implementations" appearing throughout this specification does not necessarily refer to a same embodiment. In addition, these particular features, structures, or characteristics may be combined in one or more embodiments in any appropriate manner.

It should be understood that in the embodiments provided in this application, "B corresponding to A" indicates that B is associated with A, and B may be determined based on A. However, it should further be understood that determining B based on A does not mean that B is determined based on only A. B may alternatively be determined based on A and/or other information.

It may be clearly understood by a person skilled in the art that, for the purpose of convenient and brief description, for a detailed working process of the foregoing system, apparatus, and unit, refer to a corresponding process in the method embodiments. Details are not described herein again.

What is claimed is:

1. A sensor, comprising:
a photoelectric converter, configured to convert a received optical signal into an electrical signal, to generate a photovoltage;
a second-order differential circuit, configured to perform second-order differential processing on the photovoltage, to generate a second-order differential voltage; and
a comparison circuit, configured to:
compare the second-order differential voltage with a second-order comparison threshold, to determine a comparison result; and
generate a second-order event signal based on the comparison result.

2. The sensor according to claim 1, wherein the second-order differential voltage comprises a non-zero second-order differential voltage or a zero second-order differential voltage; and
wherein the second-order differential circuit being configured to perform second-order difference on the photovoltage, to generate the second-order differential voltage comprises the second-order differential circuit being configured to:
when a change speed of a photovoltage at a current moment is different from a change speed of a photovoltage at a previous moment, generate the non-zero second-order differential voltage; or
when a change speed of a photovoltage at a current moment is the same as a change speed of a photovoltage at a previous moment, generate the zero second-order differential voltage.

3. The sensor according to claim 1, wherein the second-order differential circuit comprises:
a sample-and-hold circuit, configured to convert the photovoltage into a differential input voltage; and
a second-order differential sub-circuit, configured to perform second-order differential processing on the photovoltage based on the differential input voltage, to generate the second-order differential voltage.

4. The sensor according to claim 3, wherein the differential input voltage comprises a plurality of voltages, and voltages of the plurality of voltages correspond on a one-to-one basis to photovoltages at a plurality of different moments.

5. The sensor according to claim 3, wherein:
the second-order differential sub-circuit comprises a first first-order differential circuit and a second first-order differential circuit connected in series;
the first first-order differential circuit is configured to generate a first first-order differential voltage and a second first-order differential voltage based on the differential input voltage; and
the second first-order differential circuit is configured to generate the second-order differential voltage based on the first first-order differential voltage and the second first-order differential voltage.

6. The sensor according to claim 5, wherein the comparison circuit is further configured to:
compare the first first-order differential voltage or the second first-order differential voltage with a first-order comparison threshold to generate a second comparison result; and
generate a first-order event signal based on the second comparison result.

7. The sensor according to claim 5, wherein the comparison circuit is further configured to:
separately compare the first first-order differential voltage and the second first-order differential voltage with a first-order comparison threshold, generate a first first-order event signal based on a comparison result of the first first-order differential voltage; and
generate a second first-order event signal based on a comparison result of the second first-order differential voltage.

8. The sensor according to claim 5, wherein the second-order differential circuit further comprises:
a gating circuit, configured to: when a preset condition is satisfied, control the second first-order differential circuit to generate the second-order differential voltage based on the first first-order differential voltage and the second first-order differential voltage.

9. The sensor according to claim 1, further comprising: a readout circuit; and
wherein the photoelectric converter is further configured to send the photovoltage to the readout circuit; and
wherein the readout circuit is configured to perform integration on the photovoltage, to generate an integral voltage signal.

10. An apparatus, comprising:
a sensor array, comprising a plurality of sensors, wherein each sensor of the plurality of sensors comprises:
a respective photoelectric converter, configured to convert a received optical signal into an electrical signal, to generate a respective photovoltage;
a respective second-order differential circuit, configured to perform second-order differential processing on the respective photovoltage, to generate a respective second-order differential voltage; and
a respective comparison circuit, configured to:
compare the respective second-order differential voltage with a second-order comparison threshold, to determine a respective comparison result; and
generate a respective second-order event signal based on the respective comparison result; and
send the respective second-order event signal to a peripheral circuit; and
the peripheral circuit, configured to, for each received second-order event signal, generate an address event representation based on the respective second-order event signal, wherein each address event representation comprises the respective second-order event signal and position information of the sensor that generated the respective second-order event signal.

11. A camera, comprising:
the apparatus according to claim 10; and
an operating circuit, configured to, for each address event representation, generate an image based on the respective address event representation.

12. A mobile terminal device, comprising:
the camera according to claim 11; and
a transmitter, configured to send each generated image to another device.

13. A system, comprising:
the apparatus according to claim 10, and
an operating circuit, configured to, for each address event representation, perform scene recognition based on the respective address event representation.

14. A method, comprising:
converting an optical signal into an electrical signal, to generate a photovoltage;
performing second-order differential processing on the photovoltage, to generate a second-order differential voltage; and
comparing the second-order differential voltage with a second-order comparison threshold to determine a comparison result, and generating a second-order event signal based on the comparison result.

15. The method according to claim 14, wherein the second-order differential voltage comprises a non-zero second-order differential voltage or a zero second-order differential voltage; and
wherein performing second-order difference on the photovoltage, to generate the second-order differential voltage, comprises:
when a change speed of a photovoltage at a current moment is different from a change speed of a photovoltage at a previous moment, generating the non-zero second-order differential voltage; or
when the change speed of the photovoltage at the current moment is the same as the change speed of the photovoltage at the previous moment, generating the zero second-order differential voltage.

16. The method according to claim 14, wherein performing second-order differential processing on the photovoltage comprises:
performing first-order differential processing on the photovoltage, to generate a first-order differential voltage; and
performing first-order differential on the first-order differential voltage, to generate the second-order differential voltage.

17. The method according to claim 16, further comprising:
comparing the first-order differential voltage with a first-order comparison threshold to generate a second comparison result, and generating a first-order event signal based on the second comparison result.

18. The method according to claim 14, further comprising: performing integration on the photovoltage, to generate an integral voltage signal.

* * * * *